United States Patent
Hirai et al.

(10) Patent No.: US 10,218,910 B2
(45) Date of Patent: *Feb. 26, 2019

(54) CONTINUOUS IMAGE CAPTURING BASED ON DETECTION OF A SPECIFIC STATE

(71) Applicant: SONY CORPORATION, Tokyo (JP)

(72) Inventors: Akira Hirai, Kanagawa (JP); Akira Fukuda, Kanagawa (JP); Takuya Higuchi, Tokyo (JP); Satoshi Takada, Tokyo (JP); Tsuyoshi Harata, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 27 days.

This patent is subject to a terminal disclaimer.

(21) Appl. No.: 14/558,932

(22) Filed: Dec. 3, 2014

(65) Prior Publication Data

US 2015/0085161 A1 Mar. 26, 2015

Related U.S. Application Data

(63) Continuation of application No. 14/161,954, filed on Jan. 23, 2014, now Pat. No. 8,934,041, which is a continuation of application No. 13/170,832, filed on Jun. 28, 2011, now Pat. No. 8,675,110.

(30) Foreign Application Priority Data

Aug. 23, 2010 (JP) ................................. 2010-185706

(51) Int. Cl.
*H04N 5/77* (2006.01)
*H04N 5/232* (2006.01)
*H04N 5/345* (2011.01)

(52) U.S. Cl.
CPC ..... *H04N 5/23293* (2013.01); *H04N 5/23245* (2013.01); *H04N 5/345* (2013.01); *H04N 5/772* (2013.01)

(58) Field of Classification Search
CPC ........... H04N 5/23293; H04N 5/23245; H04N 5/772; H04N 5/345
See application file for complete search history.

(56) References Cited

U.S. PATENT DOCUMENTS

| | | | | |
|---|---|---|---|---|
| 6,734,903 B1 * | 5/2004 | Takeda | ..................... | G03B 5/00 348/219.1 |
| 8,675,110 B2 * | 3/2014 | Hirai et al. | .............. | 348/333.01 |
| 8,934,041 B2 * | 1/2015 | Hirai et al. | .............. | 348/333.01 |

(Continued)

*Primary Examiner* — Dennis A Hogue
(74) *Attorney, Agent, or Firm* — Chip Law Group

(57) ABSTRACT

An apparatus includes: an element that receives subject light from a subject to generate image data; a section that generates a recording image to be recorded on a recording medium from the image data when a first mode is set; a section that generates a second display image, which allows display of a live-view image, from the image data when a second mode is set, and that generates a first display image, which allows display of an image identical to the recording image, from the image data when the first mode is set; a section that sequentially displays the first display image or the second display image; a section that detects a specific state of the apparatus that obstructs recording of an imaging object onto the recording image; and a section that controls switching between the first mode and the second mode on the basis of the detection results.

34 Claims, 5 Drawing Sheets

(56) References Cited

U.S. PATENT DOCUMENTS

| | | | |
|---|---|---|---|
| 2003/0147640 A1* | 8/2003 | Voss et al. | 396/310 |
| 2003/0156212 A1* | 8/2003 | Kingetsu et al. | 348/333.12 |
| 2003/0169278 A1* | 9/2003 | Obrador | 345/629 |
| 2004/0212689 A1* | 10/2004 | Nakajima et al. | 348/222.1 |
| 2006/0006844 A1* | 1/2006 | Koyama | 320/166 |
| 2008/0211931 A1* | 9/2008 | Fujisawa et al. | 348/231.99 |
| 2009/0310009 A1* | 12/2009 | Ejima | 348/333.01 |

* cited by examiner

CONTINUOUS IMAGE CAPTURING BASED ON DETECTION OF A SPECIFIC STATE

This application is a continuation of U.S. patent application Ser. No. 14/161,954 filed on Jan. 23, 2014, which is a continuation of U.S. patent application Ser. No. 13/170,832 filed on Jun. 28, 2011, which claims priority from Japanese Patent Application 2010-185706 filed in the Japan Patent Office on Aug. 23, 2010. Each of the above referenced applications is hereby incorporated herein by reference in its entirety.

BACKGROUND

The present disclosure relates to an imaging apparatus, and in particular to an imaging apparatus that continuously captures a plurality of recording images, a method of controlling the imaging apparatus, and a program that causes a computer to execute the method.

In recent years, imaging apparatuses such as digital still cameras that capture an image of a subject such as a person to generate a captured image and record the generated captured image have been commonly used. Among the imaging apparatuses, imaging apparatuses equipped with a continuous image capture (shooting) function are widely used.

For example, an imaging apparatus that performs quick image processing on continuously captured images to provide a high-speed continuous shooting function is proposed (see Japanese Unexamined Patent Application Publication No. 2008-219319 (FIG. 4), for example). In the imaging apparatus, image data (RAW data) generated by an imaging element are subjected to a correction process performed by a front engine, and the correction-processed image data are supplied to a plurality of back engines, one by one. After being subjected to image processing performed by the back engines, the image data are recorded onto a recording medium in the chronological order of capture. In the imaging apparatus, the plurality of back engines perform image processing to achieve high-speed image processing, which improves the continuous shooting speed. Since the plurality of back engines perform image processing, in addition, the speed of generation of an after-view image (a display image that allows a user to examine an image captured for recording) from the image-processed data (image data for recording) is also improved.

SUMMARY

According to the technology of the related art discussed above, it is possible to display an after-view image, which is generated on the basis of the quickly image-processed image data for recording, during continuous shooting.

According to the technology of the related art described above, however, a suspension of continuous shooting due to a factor other than a delay in image processing may cause a suspension of generation of an after-view image along with the suspension of the continuous shooting, and hence a suspension of updating of display on a display screen (frozen display). Thus, in the case where the display on the display screen is frozen until the continuous shooting action is resumed, a deviation in composition may be caused between the image being displayed (after-view image) and the subject included in the image capture range. Therefore, as the time of the suspension of the continuous shooting action becomes longer, the deviation in composition between the after-view image and the subject included in the image capture range becomes larger, which may make it difficult for the user to acquire an intended captured image. Thus, it is important to appropriately provide the user with a display image for subject examination when continuously capturing a plurality of recording images.

It is therefore desirable to appropriately provide a user with a display image for subject examination when continuously capturing a plurality of recording images.

According to a first embodiment of the present disclosure, there is provided an imaging apparatus including: an imaging element that receives subject light from a subject to generate image data; a recording image generation section that generates a recording image, which is an image to be recorded on a recording medium, on the basis of the image data generated by the imaging element in the case where a first mode is set; a display image generation section that generates a second display image, which allows display of a live-view image, on the basis of the image data generated by the imaging element in the case where a second mode is set, and that generates a first display image, which allows display of an image that is identical to the recording image, on the basis of the image data generated by the imaging element in the case where the first mode is set; a display section that sequentially displays the first display image or the second display image generated by the display image generation section; a detection section that detects a specific state which is a state of the imaging apparatus that obstructs recording of an imaging object onto the recording image; and a mode control section that performs mode switching control, in which switching is performed between the first mode and the second mode, on the basis of results of detection performed by the detection section. According to the first embodiment of the present disclosure, there are also provided a method of controlling the imaging apparatus, and a program that causes a computer to execute the method. This makes it possible to perform the mode switching control on the basis of the detection results of a specific state which is a state of the imaging apparatus that obstructs recording of an imaging object onto the recording image.

In the first embodiment, the imaging apparatus may further include an operation receiving section that receives a continuous image capture action command operation, and the mode control section may perform the mode switching control in the case where the continuous image capture action command operation is received. This makes it possible to perform the mode switching control in the case where a continuous image capture action is performed.

In the first embodiment, the imaging apparatus may further include an operation receiving section that receives an image capture action command operation, and the mode control section may perform the mode switching control in the case where a continuity of the continuous image capture action command operations is received. This makes it possible to perform the mode switching control in the case where a continuity of continuous image capture actions is performed.

In the first embodiment, the display image generation section may perform a thinning-out process or an adding process on the image data generated by the imaging element to generate the first display image on the basis of image data generated through the thinning-out or adding process in the case where the first mode is set. This makes it possible to perform a thinning-out process on the image data generated by the imaging element to generate the first display image on the basis of image data generated through the thinning-out process in the case where the first mode is set.

In the first embodiment, the imaging element may generate the image data through all-pixel reading in the case where the first mode is set, and generate the image data through thinned-out reading or added reading in the case where the second mode is set. This makes it possible to generate the image data through all-pixel reading in the case where the first mode is set, and to generate the image data through thinned-out reading in the case where the second mode is set.

In the first embodiment, the mode control section may perform control for switching from the first mode to the second mode at a timing when reading of the image data from the imaging element is terminated in the case where the first mode is set. This makes it possible to perform control for switching from the first mode to the second mode at a timing when reading of the image data from the imaging element is terminated in the case where the first mode is set. In this case, in addition, in the case where the control for switching from the first mode to the second mode is performed at the timing, the mode control section may disable control for switching from the second mode to the first mode until a predetermined time elapses from the timing. This makes it possible to enable control for switching from the second mode to the first mode after a predetermined time elapses from the timing when control for switching from the first mode to the second mode is performed.

In the first embodiment, the display section may display the second display image in the case where the second mode is set, and display the first display image in the case where the first mode is set. This makes it possible to display the second display image in the case where the second mode is set, and to display the first display image in the case where the first mode is set.

In the first embodiment, the display section may be an electronic view finder. This makes it possible to display the second display image or the first display image on the electronic view finder.

In the first embodiment, the imaging apparatus may further include a data duplication section that duplicates the image data generated by the imaging element to supply the duplicated image data to the recording image generation section and the display image generation section in the case where the first mode is set, and a buffer provided between the data duplication section and the recording image generation section to retain a plurality of pieces of the image data being supplied from the data duplication section to the recording image generation section in a chronological order and to supply the retained data to the recording image generation section in accordance with a status of generation of the recording image performed by the recording image generation section, and the detection section may detect the specific state on the basis of a free space of the buffer. This makes it possible to detect the specific state on the basis of a free space of the buffer.

In the first embodiment, the imaging apparatus may further include an in-focus determination section that performs in-focus determination on the basis of the subject light, and the detection section may detect the specific state on the basis of results of the in-focus determination. This makes it possible to detect the specific state on the basis of results of the in-focus determination.

In the first embodiment, the imaging apparatus may further include a light emitting section that momentarily emits light to the subject in the case where the first mode is set, and the detection section may detect the specific state on the basis of a state of charge of the light emitting section. This makes it possible to detect the specific state on the basis of a state of charge of the light emitting section.

In the first embodiment, the imaging apparatus may further include a power source management section that compares an amount of current that may be supplied to various sections of the imaging apparatus and an amount of current that is necessary for the various sections to manage an amount of current to be supplied to the various sections, and the detection section may detect the specific state on the basis of results of management performed by the power source management section. This makes it possible to detect the specific state on the basis of results of management performed by the power source management section.

In the first embodiment, the detection section may detect the specific state on the basis of occurrence of a change to a setting of the imaging apparatus. This makes it possible to detect the specific state on the basis of occurrence of a change to a setting of the imaging apparatus.

According to the present disclosure, it is advantageously possible to appropriately provide a user with a display image for subject examination when continuously capturing a plurality of recording images.

DETAILED DESCRIPTION OF EMBODIMENTS

An embodiment of the present disclosure will be described below:

[Exemplary Functional Configuration of Imaging Apparatus]

Figure 1:
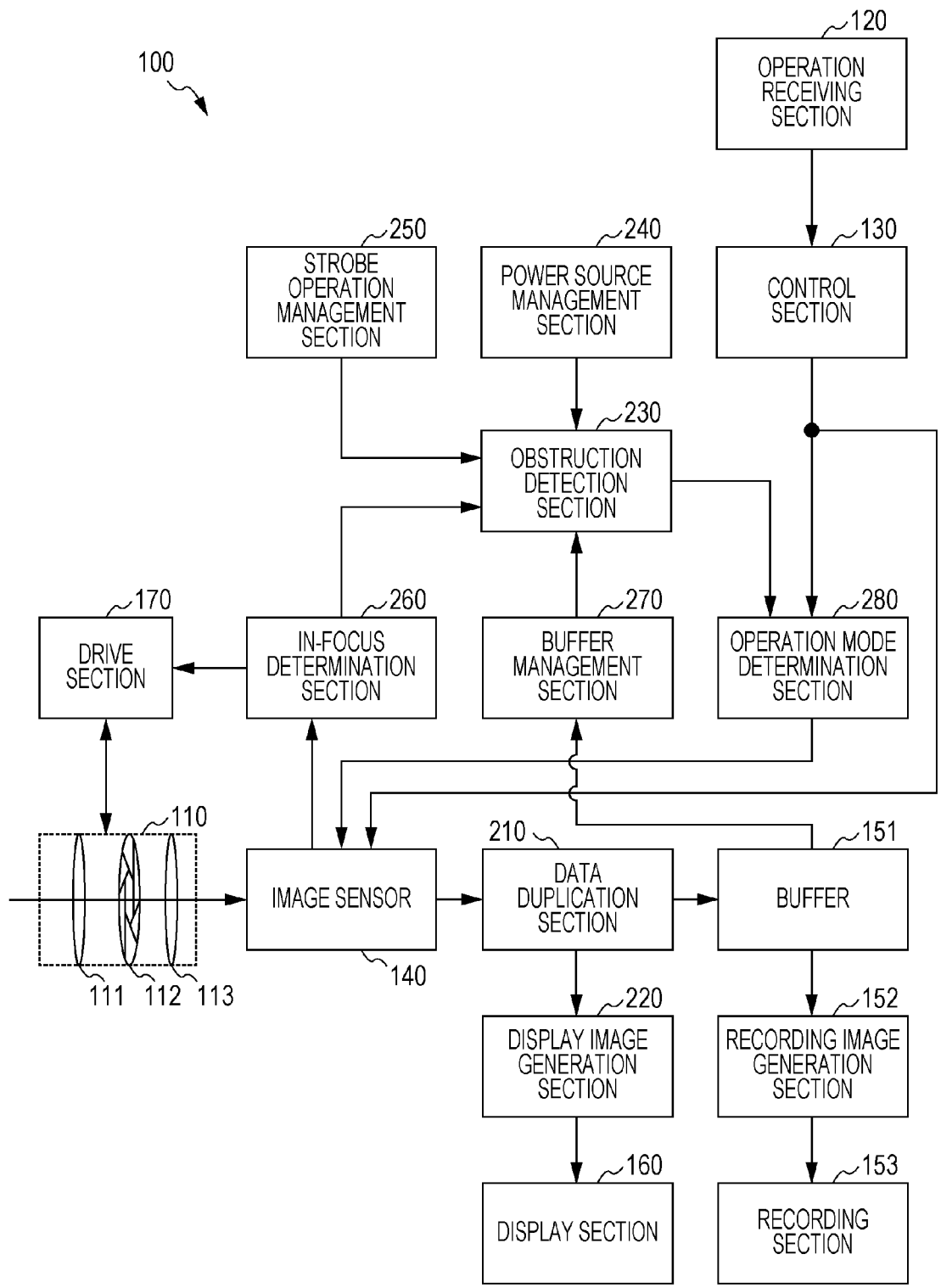
FIG. 1 is a block diagram showing an exemplary functional configuration of an imaging apparatus according to an embodiment of the present disclosure.

FIG. 1 is a block diagram showing an exemplary functional configuration of an imaging apparatus 100 according to an embodiment of the present disclosure. The imaging apparatus 100 is an imaging apparatus that captures an image of a subject to generate image data and record the generated image data as an image content (recording image).

The imaging apparatus 100 includes a lens section 110, an operation receiving section 120, a control section 130, an image sensor 140, a buffer 151, a recording image generation section 152, a recording section 153, a display section 160, and a drive section 170. The imaging apparatus 100 also includes a data duplication section 210, a display image generation section 220, an obstruction detection section 230, a power source management section 240, a strobe operation management section 250, an in-focus determination section 260, a buffer management section 270, and an operation mode determination section 280.

The lens section 110 condenses light from a subject (subject light). The lens section 110 includes a zoom lens 111, a diaphragm 112, and a focus lens 113.

The zoom lens 111 is driven by the drive section 170 to move in the optical axis direction to vary the focal length in order to adjust the magnification of the subject included in a captured image.

The diaphragm 112 is a shielding object driven by the drive section 170 to vary the degree of opening in order to adjust the amount of the subject light to be incident into the image sensor 140.

The focus lens 113 is driven by the drive section 170 to move in the optical axis direction in order to adjust a focus state.

The operation receiving section 120 receives an operation from a user. For example, in the case where a shutter button 121 (shown in FIG. 2) is depressed, the operation receiving section 120 supplies the control section 130 with a signal related to the depression (image capture command operation) as an operation signal.

The control section 130 controls various operations performed in the imaging apparatus 100. For example, in the case where the image capture mode of the imaging apparatus 100 is set to a continuous shooting mode, in the case where the shutter button 121 is depressed, the control section 130 determines that an operation for commanding continuous image capture (continuous image capture command operation) has been received, and commands execution of recording (continuous shooting) of a plurality of chronologically continuous still images. The control section 130 supplies the operation mode determination section 280 and the image sensor 140 with a signal for commanding execution of continuous shooting (continuous shooting action signal).

The image sensor 140 is an imaging element that performs photoelectric conversion on the received subject light into an electrical signal. The image sensor 140 may be implemented by a CMOS (Complementary Metal Oxide Semiconductor) sensor, a CCD (Charge Coupled Device) sensor, or the like, for example. The image sensor 140 generates RAW data, which are unprocessed (undeveloped) image data which have not been subjected to a correction process etc., on the basis of the electrical signal produced through the photoelectric conversion.

In the case where the operation mode of the imaging apparatus 100 is the continuous shooting mode, the image sensor 140 switches between a recording image generation mode for generating a still image and a live-view image generation mode for generating a live-view image. The term "live-view image" as used herein refers to a real-time display of an image of the subject to be incident into the imaging apparatus 100. In the case where the image sensor 140 is set to the recording image generation mode, electrical signals are read from all the pixels disposed in the image sensor 140 to generate RAW data (RAW data (all pixels)). In the case where the image sensor 140 is set to the live-view image generation mode, electrical signals are read from the pixels disposed in the image sensor 140 in such a manner that results in a reduced amount of read data to generate RAW data. In the embodiment of the present disclosure, the image sensor 140 set to the live-view image generation mode performs thinned-out reading when reading electrical signals from the pixels disposed in the image sensor 140 to generate RAW data (RAW data (thinned out)). Another method that results in a reduced amount of read data is to add electrical signals read from adjacent pixels when reading data to generate RAW data (added reading) on the basis of the added read data.

Since the RAW data (all pixels) are generated through all-pixel reading and the RAW data (thinned out) are generated through thinned-out reading, the frame rate (interval between generations of RAW data) is higher in the live-view image generation mode for generating RAW data (thinned out). The image sensor 140 supplies the generated RAW data to the data duplication section 210.

The image sensor 140 supplies the in-focus determination section 260 with signals generated by pixels disposed at a position corresponding to an area in which focusing is performed (focus area). The recording image generation mode is an example of a first mode according to an embodiment of the present disclosure. The live-view image generation mode is an example of a second mode according to an embodiment of the present disclosure.

The data duplication section 210 duplicates the RAW data (RAW data (all pixels)) generated by the image sensor 140 set to the recording image generation mode to supply the duplicated RAW data to the buffer 151 and the display image generation section 220. Also, the data duplication section 210 supplies the RAW data (RAW data (thinned out)) generated by the image sensor 140 set to the live-view image generation mode only to the display image generation section 220.

The buffer 151 temporarily retains the RAW data (RAW data (all pixels)) supplied from the data duplication section 210. The RAW data (all pixels) retained in the buffer 151 are used by the recording image generation section 152 to generate image data (recording image data). The buffer 151 has a capacity enough to retain a plurality of pieces of RAW data (RAW data (all pixels)) generated through all-pixel reading, and sequentially retains the RAW data supplied from the data duplication section 210 in the chronological order. The buffer 151 is an area of a RAM (Random Access Memory) provided in the imaging apparatus 100 that is assigned to the RAW data (all pixels) to be processed in the recording image generation section 152, for example. In the case where the recording image data are recorded by the recording section 153 so that the process to be performed by the recording image generation section 152 has been terminated, the buffer 151 supplies the recording image generation section 152 with one piece of the retained RAW data that is the oldest in the chronological order to cause the recording image generation section 152 to start a next process. Also, the buffer 151 supplies the buffer management section 270 with information indicating the status of use of the buffer 151.

The recording image generation section 152 generates recording image data, which are to be recorded by the recording section 153, on the basis of the RAW data (all pixels) supplied from the buffer 151. The recording image generation section 152 performs a correction process, a development process, an image data compression process, etc., on the basis of the RAW data (all pixels), for example. The recording image generation section 152 supplies the generated recording image data to the recording section 153 to cause the recording section 153 to store the supplied recording image data.

The generation of the recording image data performed by the recording image generation section 152 will be described on the assumption that an image compressed in accordance with a JPEG (Joint Photographic Experts Group) scheme is to be recorded by the recording section 153 as the recording image data. First, the recording image generation section 152 performs a correction process, a development process, etc., on the basis of the RAW data to generate an image. Subsequently, the recording image generation section 152 performs an image data compression process on the basis of the JPEG scheme, and records the generated compressed recording image data (JPEG data) on the recording section 153.

In the case where the RAW data as they are to be recorded by the recording section 153 as the recording image data, the recording image generation section 152 does not perform a development process etc. to supply the RAW data as they are to the recording section 153 as the recording image data to cause the recording section 153 to store the supplied RAW data.

The recording section 153 records the recording image data supplied from the recording image generation section 152 as an image content (image file). As the recording section 153, a disk such as a DVD (Digital Versatile Disk) and a removable recording medium (one or a plurality of recording media) such as a semiconductor memory such as a memory card may be used, for example. Such a recording medium may be built in the imaging apparatus 100 or removably mounted to the imaging apparatus 100.

The display image generation section 220 generates display image data, which are to be viewed by the user on the display section 160, on the basis of the RAW data supplied from the data duplication section 210. In the case where the RAW data (all pixels) are supplied from the data duplication section 210, first, the display image generation section 220 performs a process for reducing the amount of the RAW data (all pixels). As such a process, the display image generation section 220 according to the embodiment of the present disclosure may perform a process for thinning out pixel-by-pixel information contained in the RAW data (all pixels) at predetermined intervals to generate thinned-out data. Then, the display image generation section 220 performs a development process using the thinned-out data, and supplies image data (display image data) generated through the development process to the display section 160 to cause the display section 160 to display the supplied display image data. Besides the thinning-out process, another method that results in a reduced amount of data is to add data from adjacently disposed pixels to reduce the amount of data (adding process).

In the case where RAW data (thinned out) are supplied, the display image generation section 220 performs a development process using the supplied RAW data (thinned out), and supplies display image data generated through the development process to the display section 160 to cause the display section 160 to display the supplied display image data.

The display section 160 displays an image on the basis of the display image data supplied from the display image generation section 220. The display section 160 may be implemented by a color liquid crystal panel, for example.

The in-focus determination section 260 determines whether or not an object to be focused on (focusing object) is in focus on the basis of a signal for use for in-focus determination supplied from the image sensor 140. The in-focus determination section 260 may determine whether or not the focusing object is in focus using a contrast scheme, for example. The in-focus determination section 260 supplies the drive section 170 with a signal for driving the focus lens 113 to detect a focus state. In the case where the focusing object which was brought into focus has continued to be in focus, the in-focus determination section 260 supplies the drive section 170 with information indicating the in-focus state as in-focus determination result information. In the case where the focusing object which was brought into focus has shifted out of focus, the in-focus determination section 260 calculates (estimates) the amount of the shift (defocus amount), and supplies the drive section 170 with information indicating the calculated defocus amount as the in-focus determination result information. In the case where the focusing object has shifted out of focus so abruptly that the defocus amount may not be estimated (in a state in which the focusing object may not brought into focus by auto focus, the in-focus determination section 260 supplies the drive section 170 with information indicating that the defocus amount may not be estimated as the in-focus determination result information. The in-focus determination section 260 also supplies the in-focus determination result information to the obstruction detection section 230.

The drive section 170 drives the zoom lens 111, the diaphragm 112, and the focus lens 113. For example, the drive section 170 calculates the drive amount of the focus lens 113 on the basis of the in-focus determination result information output from the in-focus determination section 260, and moves the focus lens 113 in accordance with the calculated drive amount. In the case where the focusing object is in focus, the drive section 170 maintains the current position of the focus lens 113. In the case where the focusing object is out of focus, the drive section 170 calculates the drive amount (amount of movement) on the basis of the in-focus determination result information indicating the defocus amount and information on the position of the focus lens 113, and moves the focus lens 113 in accordance with the calculated drive amount. In the case where the in-focus determination result information indicating that the defocus amount may not be estimated, the drive section 170 attempts to quickly establish a state in which the focusing object is in focus by scanning the focus lens 113 over the entire range, for example.

The power source management section 240 manages a power source in the imaging apparatus 100. The power source management section 240 compares the amount of current that may be supplied by the power source and the amount of current that is necessary to drive the various sections of the imaging apparatus 100 to supply information indicating the comparison results (power source information) to the obstruction detection section 230.

The strobe operation management section 250 manages an operation of a strobe (not shown). The strobe operation management section 250 supplies the obstruction detection section 230 with information indicating the remaining charge capacity of the strobe. The strobe is an example of a light emitting section according to an embodiment of the present disclosure.

The buffer management section 270 manages the buffer 151 in the imaging apparatus 100. The buffer management section 270 supplies the obstruction detection section 230 with information indicating the free space of the buffer 151.

The obstruction detection section 230 detects whether or not an obstructive factor (specific state) that obstructs image capture (recording of an imaging object onto a recording image) is occurring while continuously capturing a plurality of recording images (during a continuous shooting action). The obstruction detection section 230 detects whether or not an obstructive factor is occurring on the basis of the status of operations of the various sections of the imaging apparatus 100, and supplies the operation mode determination section 280 with the detection results as continuous shooting determination information. In the case where an obstructive factor that obstructs image capture is not occurring so that a continuous shooting action may be continued, the obstruction detection section 230 supplies the operation mode determination section 280 with the continuous shooting determination information indicating that continuous shooting is allowed (for example, of signals at two potentials (H and L), a signal at an L-level potential). In the case where an obstructive factor is occurring so that a continuous shooting action may not be performed, the obstruction detection section 230 supplies the operation mode determination section 280 with the continuous shooting determination information indicating that an obstructive factor is occurring (for example, a signal at an H-level potential). The obstruction detection section 230 is an example of a detection section according to an embodiment of the present disclosure.

The detection of an obstructive factor performed on the basis of the information from the buffer management section 270, the in-focus determination section 260, the strobe operation management section 250, and the power source management section 240 will be described.

The obstruction detection section 230 calculates the number of pieces of RAW data (all pixels) that may additionally be retained in the buffer 151 on the basis of the information supplied from the buffer management section 270. Then, in the case where it is detected that there is a free space for retaining RAW data (all pixels), the obstruction detection section 230 supplies the continuous shooting determination information indicating that continuous shooting is allowed. Meanwhile, in the case where it is detected that RAW data (all pixels) will no longer be retained (for example, only a free space for one image left), the obstruction detection section 230 supplies the continuous shooting determination information indicating that an obstructive factor is occurring. In the case where it is detected that the free space of the buffer 151 has been recovered so that RAW data (all pixels) may additionally be retained again as a result of progress of the process performed by the recording image generation section 152, for example, the obstruction detection section 230 supplies the continuous shooting determination information indicating that continuous shooting is allowed.

In the case where the in-focus determination result information indicating that the defocus amount may not be estimated is supplied from the in-focus determination section 260, the obstruction detection section 230 supplies the continuous shooting determination information indicating that an obstructive factor is occurring. Meanwhile, in the case where the in-focus determination result information indicating the in-focus state or the in-focus determination result information indicating the defocus amount is supplied from the in-focus determination section 260, the obstruction detection section 230 supplies the continuous shooting determination information indicating that continuous shooting is allowed.

The obstruction detection section 230 calculates the remaining number of times that the strobe may be used on the basis of the information supplied from the strobe operation management section 250. Then, in the case where it is detected that the strobe will no longer be used (for example, only one time left), the obstruction detection section 230 supplies the continuous shooting determination information indicating that an obstructive factor is occurring. Meanwhile, in the case where it is detected that the strobe may be used again as a result of progress of charge of the strobe, the obstruction detection section 230 supplies the continuous shooting determination information indicating that continuous shooting is allowed.

The obstruction detection section 230 monitors whether or not the current falls short on the basis of the information supplied from the power source management section 240. Then, in the case where it is detected that the current falls short, the obstruction detection section 230 supplies the continuous shooting determination information indicating that an obstructive factor is occurring. In this case, in addition, in the case where it is detected that a surplus current is produced and the shortage of the current has been resolved as a result of termination of a recording operation performed by the recording section 153 or the like, the obstruction detection section 230 supplies the continuous shooting determination information indicating that continuous shooting is allowed.

The operation mode determination section 280 determines whether to capture an image in the recording image generation mode or to capture an image in the live-view image generation mode to control mode switching in the case where the operation mode of the imaging apparatus 100 is the continuous shooting mode. In the case where the continuous shooting action signal is supplied from the control section 130 and the continuous shooting determination information indicating that continuous shooting is allowed is supplied from the obstruction detection section 230, the operation mode determination section 280 supplies the image sensor 140 with information indicating the recording image generation mode. Meanwhile, in the case where the continuous shooting action signal is supplied from the control section 130 and the continuous shooting determination information indicating that an obstructive factor is occurring is supplied from the obstruction detection section 230, the operation mode determination section 280 supplies the image sensor 140 with information indicating the live-view image generation mode.

In the case where the continuous shooting determination information indicating that an obstructive factor is occurring is supplied and switching is performed from information indicating the recording image generation mode to information indicating the live-view image generation mode, the operation mode determination section 280 starts to determine whether or not to switch information to supply after a predetermined time elapses. For example, in the case where the interval of image captures through continuous shooting is 100 msec, the operation mode determination section 280 starts to determine whether or not to switch to information indicating the recording image generation mode on the basis of the information from the obstruction detection section 230 after a period of 100 msec elapses after switching to the live-view image generation mode. The operation mode determination section 280 is an example of a mode control section according to an embodiment of the present disclosure.

[Exemplary Cross-Sectional Configuration of Imaging Apparatus]

Figure 2:
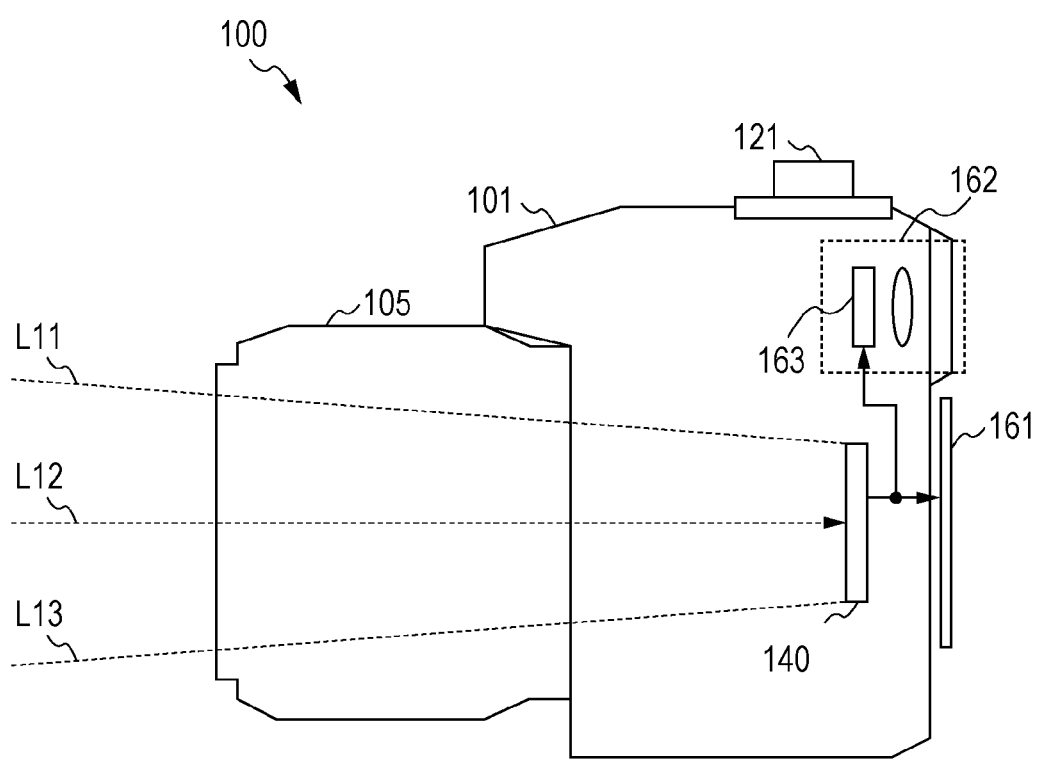
FIG. 2 is a cross-sectional view schematically showing an exemplary cross-sectional configuration of the imaging apparatus according to the embodiment of the present disclosure.

FIG. 2 is a cross-sectional view schematically showing an exemplary cross-sectional configuration of the imaging apparatus 100 according to the embodiment of the present disclosure. In the drawing, the imaging apparatus 100 is assumed to be a single-lens camera.

In FIG. 2 which is a cross-sectional view of the imaging apparatus 100, a body 101 and an interchangeable lens 105 are shown. The interchangeable lens 105 is a removably mounted lens unit of the imaging apparatus 100, and corresponds to the lens section 110 shown in FIG. 1. The body 101 is a main body of the imaging apparatus 100 that performs an image capture process, and corresponds to components other than the lens section 110 shown in FIG. 1.

In the body 101, the shutter button 121, the image sensor 140, a display section 161, and an EVF (Electronic View Finder) 162 are shown.

In FIG. 2, an optical axis (optical axis L12) of the lenses provided in the lens section 110 and two lines (lines L11 and L13) indicating the range over which the subject light passes are also shown. The range between the lines L11 and L13 indicates the range over which light passes to be incident into the image sensor 140.

The display section 161 is a liquid crystal monitor provided on the back surface of the body 101. The display section 161 displays a display image generated on the basis of the RAW data generated by the image sensor 140. The resolution (number of pixels) of the display section 161 is significantly smaller than the resolution of the RAW data (all pixels) generated by the image sensor 140. For example, while the RAW data (all pixels) have a high resolution of about 4600×3000 pixels (13,800,000 pixels) or the like, the display section 161 has a low resolution of about 920,000 pixels or the like.

The EVF 162 is an electronic view finder that uses a liquid crystal monitor, and displays the display image generated by the display image generation section 220 to inform the user of the composition of the image. In the EVF 162, a display section 163 is shown as a liquid crystal monitor.

The display section 163 is a display screen in the EVF 162. As with the display section 161, the display section 163 displays a display image generated on the basis of the RAW data generated by the image sensor 140. The display section 163 is disposed inside the body 101, and viewed by the user via an eyepiece lens. Therefore, the display section 163 is easily viewable even in a bright place compared to the display section 161. The resolution (number of dots) of the display section 163 is further smaller than the resolution of the display section 161.

Thus, the imaging apparatus 100 is provided with an electronic finder and not with an optical finder. The display resolutions of the display sections provided in the imaging apparatus 100 are significantly lower than the resolution of the RAW data (all pixels).

[Exemplary Image Generation Based on RAW Data (all Pixels)]

Figure 3:
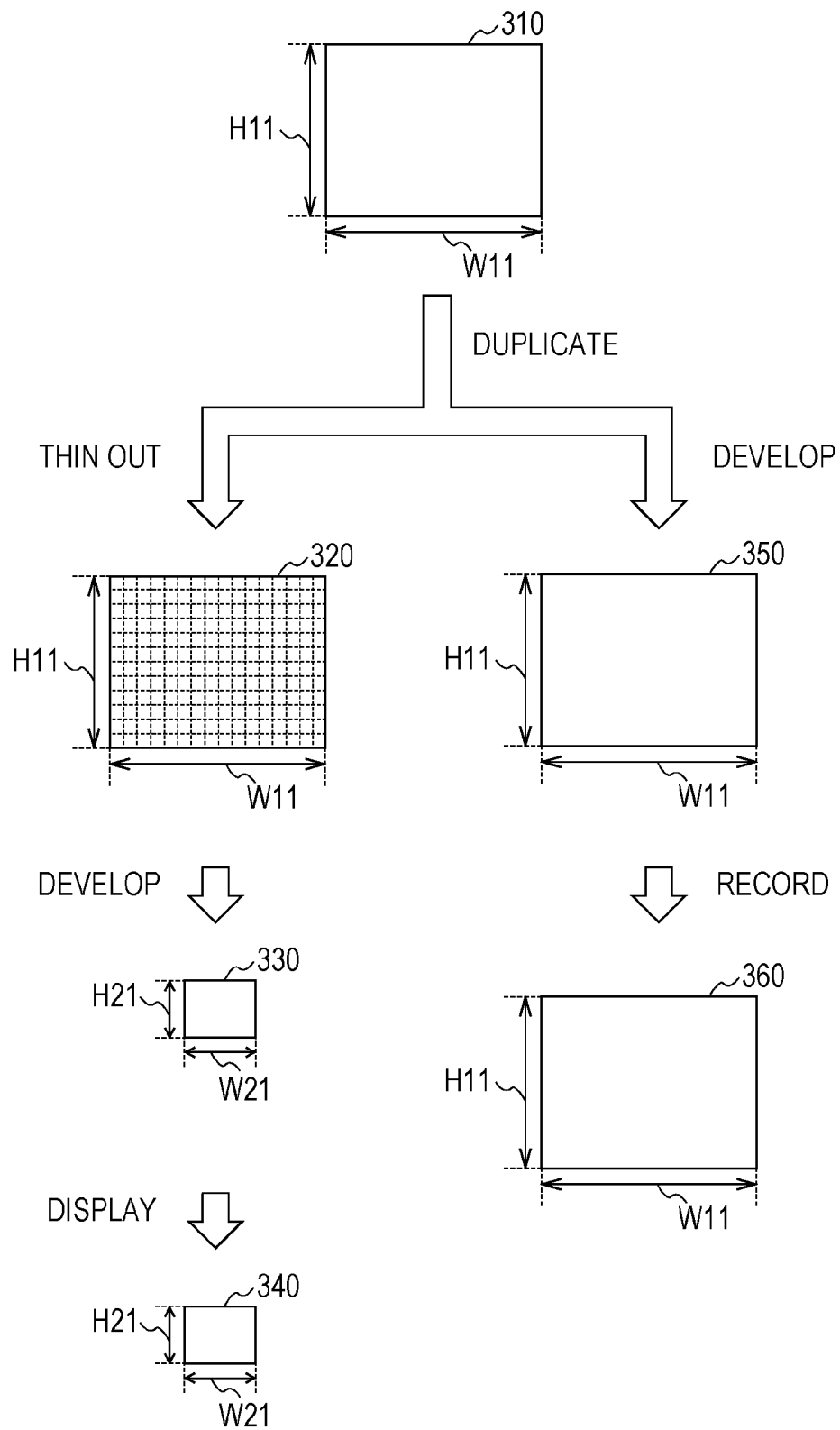
FIG. 3 is a schematic diagram showing exemplary generation of recording image data and display image data based on RAW data (all pixels) generated by an image sensor set to a recording image generation mode according to the embodiment of the present disclosure.

FIG. 3 is a schematic diagram showing exemplary generation of recording image data and display image data based on the RAW data (all pixels) generated by the image sensor 140 set to the recording image generation mode according to the embodiment of the present disclosure.

In FIG. 3, image data 310, 320, 330, 340, 350, and 360 are shown together with arrows with a description of the content of a process for generating the recording image data and the display image data.

The image data 310 schematically show the RAW data (all pixels) generated by the image sensor 140.

The image data 320 schematically show the thinned-out data in which pixel-by-pixel information (pixel data) contained in the RAW data (all pixels) has been thinned out at predetermined intervals. For example, the image data 320 are generated by thinning out the pixel data at predetermined intervals in units of rows and columns. In the image data 320, numberless broken lines are used to schematically show that the pixel data are thinned out at predetermined intervals.

The image data 330 schematically show the image generated by performing a development process on the thinned-out data (image data 320). The thinning-out process for generating the image data 320 and the development process for generating the image data 330 are performed by the display image generation section 220.

The image data 340 schematically show the image displayed on the display section 160.

The image data 350 schematically show the image generated through the development process performed by the recording image generation section 152.

The image data 360 schematically show the image recorded by the recording section 153.

In FIG. 3, the size (number of pixels) in the horizontal direction and the size (number of pixels) in the vertical direction of the RAW data (all pixels) are indicated by W11 and H11, respectively. Also, the size (number of pixels) in the horizontal direction and the size (number of pixels) in the vertical direction of the image generated through the development process (image data 330) are indicated by W21 and H21, respectively.

The process for generating the recording image data and the display image data from the RAW data (all pixels) generated by the image sensor 140 set to the recording image generation mode will be described with reference to FIG. 3.

First, the process for generating the display image data from the RAW data (all pixels) is described.

When the image sensor 140 set to the recording image generation mode captures an image, RAW data (all pixels) (image data 310) are generated. Then, the RAW data (all pixels) (image data 310) are duplicated by the data duplication section 210 to be supplied to the display image generation section 220 and the buffer 151.

The RAW data (all pixels) (image data 310) supplied to the display image generation section 220 are first subjected to a data thinning-out process. This results in generation of thinned-out data (image data 320) in which pixel-by-pixel information (pixel data) has been thinned out. In the data thinning-out process, a thinning-out process is performed in accordance with the resolution (number of pixels) of the image to be displayed on the display section 160. For example, in the case where the RAW data (all pixels) have about 4600×3000 pixels (13,800,000 pixels) and the display section 161 (see FIG. 2) has about 920,000 pixels, the thinning-out process is performed to result in a resolution of about 920,000 pixels, which is the resolution of the display section 161.

Then, the display image generation section 220 performs a development process on the thinned-out data (image data 320) in which the pixel data have been thinned out to generate display image data (image data 330). The display image data (image data 330) are generated from the thinned-out data (image data 320) which have a small amount of data, and therefore the process for generating the display image data (image data 330) is light and may be performed in a short time. Then, the display section 160 displays the display image data (image data 330) to the user as a display screen (image data 340) of an after-view image. The term "after-view image" as used herein refers to a display image that is identical to the image captured for recording (recording image) and that is displayed to allow the user to examine the composition of the recording image. That is, in the embodiment of the present disclosure, the after-view image is a display image generated on the basis of the RAW data (RAW data (all pixels)) generated by the image sensor 140 set to the recording image generation mode.

Subsequently, the process for generating the recording image data from the RAW data (all pixels) is described.

The RAW data (all pixels) (image data 310) supplied to the buffer 151 are sequentially supplied to the recording image generation section 152. Then, the recording image generation section 152 performs a development process on the RAW data (all pixels) (image data 310) to generate recording image data (image data 350). Then, the recording image data (image data 350) are subjected to a compression process etc., and thereafter recorded by the recording section 153 as recording image data (image data 360).

By generating the display image data from the thinned-out data in which information has been thinned out in accordance with the resolution of the display screen (display section 161) in the imaging apparatus 100 as described above, it is possible to improve the speed of generation of a display image.

In the imaging apparatus according to the related art, the recording image data which have been subjected to a development process (corresponding to the image data 350) is contracted (subjected to a process for reducing the resolution) to be displayed on the display screen. Therefore, in the case where continuous shooting is suspended with the buffer full, the display screen is not updated (the display either remains stationary with a contracted image (after-view image) of the last captured recording image or blacks out). According to the embodiment of the present disclosure, on the other hand, the RAW data (all pixels) before being retained in the buffer 151 are supplied to the display image generation section 220. Thus, in the case where the buffer 151 is full, a live-view image may be displayed to update the display screen.

[Exemplary Mode Switching in Continuous Shooting Action]

Figure 4:
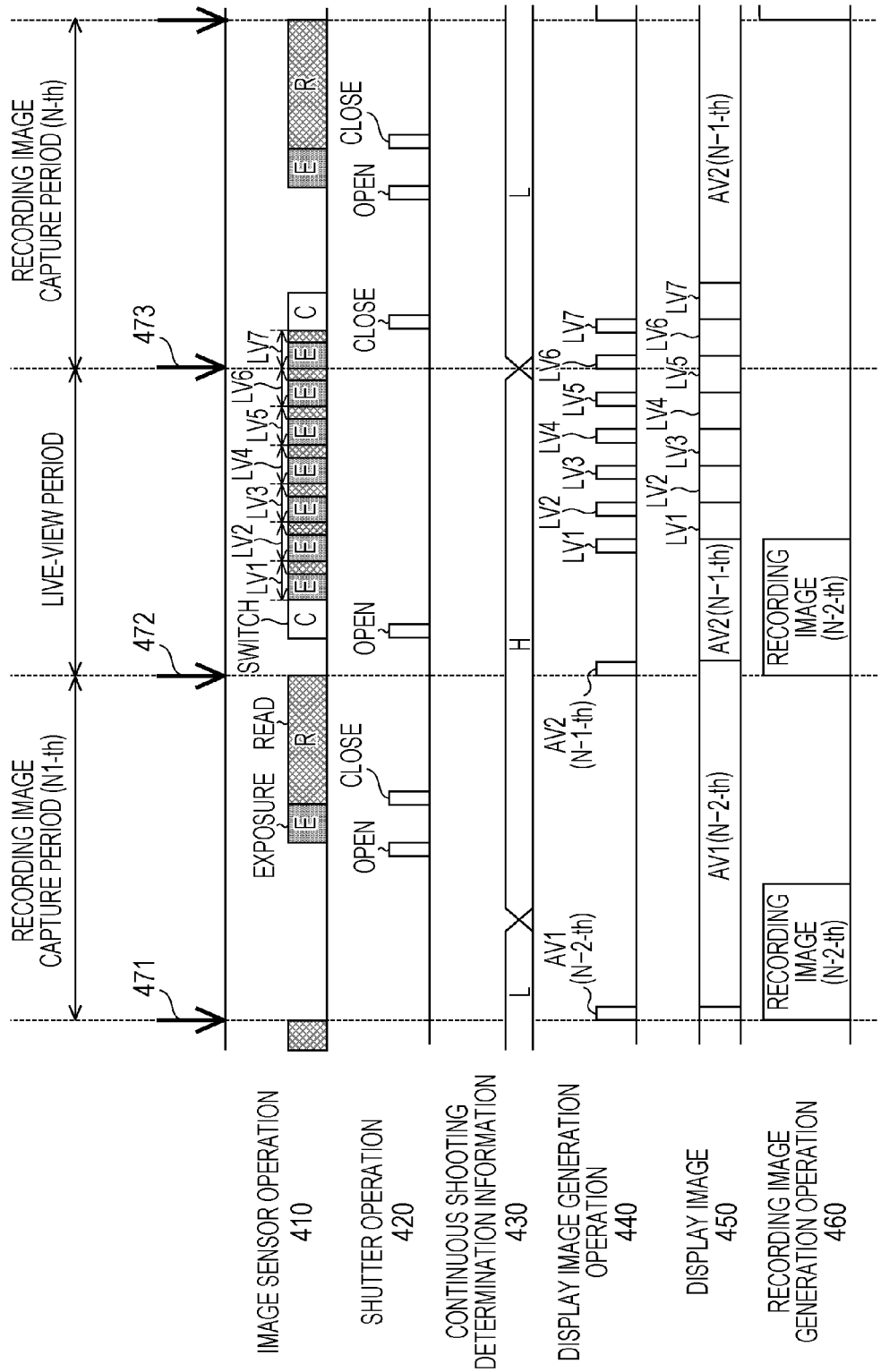
FIG. 4 is a timing chart showing exemplary mode switching between the recording image generation mode and a live-view image generation mode performed in the imaging apparatus according to the embodiment of the present disclosure during a continuous shooting action.

FIG. 4 is a timing chart showing exemplary mode switching between the recording image generation mode and the live-view image generation mode performed in the imaging apparatus 100 according to the embodiment of the present disclosure during a continuous shooting action.

In the timing chart, in which the horizontal axis is used as a common time axis, the operating state of the image sensor 140 (image sensor operation 410) and the operating state of the shutter of the image sensor 140 (shutter operation 420) are shown. Also, the continuous shooting determination information (continuous shooting determination information 430) generated by the obstruction detection section 230 and a display image generation operation (display image generation operation 440) performed by the display image generation section 220 are shown. In addition, the display image (display image 450) on the display section 160 and a recording image generation operation (recording image generation operation 460) performed by the recording image generation section 152 are shown. The timing chart also shows timings 471 to 473 to switch between the modes. The respective lengths of periods on the horizontal axis are not to scale.

In FIG. 4, it is assumed that a plurality of recording images are generated through continuous shooting by continuously depressing the shutter button. In the timing chart shown in the drawing, a recording image capture period (N-1-th) in which an N-1-th recording image is generated, a live-view period in which an operation for generating a live-view image is performed, and a recording image capture period (N-th) in which an N-th recording image is generated are shown. It is assumed that the recording image capture period (N-1-th) is started immediately after a recording image capture period (N-2-th) is terminated. That is, the N-2-th and N-1-th recording images are captured without interruption (without occurrence of mode switching).

In FIG. 4, it is also assumed that an obstructive factor occurs at a predetermined timing in the recording image capture period (N-1-th). The continuous shooting determination information 430 indicates that the supply of continuous shooting determination information indicating that continuous shooting is allowed ("L"-level signal) is stopped and the supply of continuous shooting determination information indicating that an obstructive factor is occurring ("H"-level signal) is started when the obstruction detection section 230 detects the occurrence of the obstructive factor.

First, an operation of the imaging apparatus 100 in the recording image capture period (N-1-th) is described.

When the recording image capture period (N-2-th) is terminated (reading of data on the N-2-th image is terminated), the control section 130 checks whether or not the shutter button 121 is depressed. Then, because the shutter button 121 is kept depressed, the control section 130 determines to continue continuous shooting, and continues the supply of a continuous shooting action signal (timing 471). Also at timing 471, the operation mode determination section 280 checks whether or not an obstructive factor has occurred on the basis of the continuous shooting determination information, and determines whether or not to continue the recording image generation mode (timing 471). At timing 471, because the continuous shooting determination information is an "L"-level signal indicating that continuous shooting is allowed, the recording image capture period (N-1-th) is started at the same time as the recording image capture period (N-2-th) is terminated.

In the recording image capture period (N-1-th), image capture preparation operations such focus adjustment and charge of a motor that drives the shutter are performed, and thereafter the shutter is opened ("open") to expose the image sensor 140 ("exposure (E)"). Then, at the same time as the shutter is closed ("close"), reading of data from the image sensor 140 ("read (R)") is started. In FIG. 4, these operations are shown in the image sensor operation 410 in the recording image capture period (N-1-th) and in the shutter operation 420 in the recording image capture period (N-1-th).

Along with the termination of reading of data on the N-2-th image from the image sensor 140, the display image generation section 220 generates data on a display image (after-view (AV) image (N-2-th)) ("AV1 (N-2-th)") from the RAW data (all pixels) on the N-2-th image. That is, in the display image generation section 220, thinned-out data are generated from the RAW data (all pixels) on the N-2-th image, and thereafter the generated thinned-out data are subjected to a development process to generate the after-view (AV) image (N-2-th). Then, when the generation of the after-view image data is terminated, the display sections 161 and 163 display the AV image (N-2-th) ("AV1 (N-2-th)"), which is a display image that is identical to the N-2-th recording image. In FIG. 4, these operations are shown in the display image generation operation 440 in the recording image capture period (N-1-th) and in display image 450 in the recording image capture period (N-1-th).

Along with the termination of reading of data on the N-2-th image from the image sensor 140, the recording image generation section 152 generates recording image data ("recording image (N-2-th)") on the basis of the RAW data (all pixels) on the N-2-th image. In FIG. 4, this operation is shown in the recording image generation operation 460 in the recording image capture period (N-1-th).

Subsequently, an operation of the imaging apparatus 100 in the live-view period is described.

At the timing when reading of data on the N-1-th image from the image sensor 140 is terminated (timing 472), because the shutter button 121 is kept depressed, the control section 130 determines to continue continuous shooting, and continues the supply of a continuous shooting action signal.

Also at timing 472, the operation mode determination section 280 checks whether or not an obstructive factor has occurred on the basis of the continuous shooting determination information, and determines whether or not to continue the recording image generation mode. At timing 472, because the continuous shooting determination information is an "H"-level signal indicating that an obstructive factor is occurring, the live-view period is started at the same time as the recording image capture period (N-1-th) is terminated.

In the live-view period, the operation mode of the image sensor 140 is switched from the recording image generation mode to the live-view image generation mode ("switch"). After the motor that drives the shutter is charged, the shutter is opened ("open"). Then, exposure and reading are repeated at a high speed (LV1 to LV6) to sequentially generate RAW data (thinned out) on live-view images. In FIG. 4, the operation mode of the image sensor 140 is switched ("switch") after a short time elapses in the live-view period. This indicates that there is a time lag since the operation mode determination section 280 detects a transition of the continuous shooting determination information until the image sensor 140 switches between the modes.

Along with the termination of reading of data on the N-1-th image from the image sensor 140, the display image generation section 220 generates data on an AV image (N-1-th) ("AV2 (N-1-th)") on the basis of data obtained by thinning out the RAW data (all pixels) on the N-1-th image. Then, when the generation of the AV image (N-1-th) data is terminated, the display sections 161 and 163 display the AV image (N-1-th) ("AV2 (N-1-th)"), which is a display image that is identical to the N-1-th recording image. The AV image (N-1-th) is displayed until generation of a first live-view image (LV1) is terminated. When the image sensor 140 generates RAW data (thinned out) on the live-view images, the display image generation section 220 sequentially generates display image (live-view image) data ("LV1 to LV6") on the basis of the generated RAW data (thinned out). Then, when the generation of the live-view image data is terminated, the display sections 161 and 163 sequentially display the live-view images ("LV1 to LV6").

Along with the termination of reading of data on the N-1-th image from the image sensor 140, the recording image generation section 152 generates recording image data ("recording image (N-1-th)") on the basis of the RAW data (all pixels) on the N-1-th image.

Subsequently, an operation of the imaging apparatus 100 in the recording image capture period (N-th) is described.

In the live-view period, the operation mode determination section 280 checks whether or not the obstructive factor has been resolved on the basis of the continuous shooting determination information. Then, in the case where the obstructive factor has been resolved (the continuous shooting determination information has transitioned from the "H" level to the "L" level), the recording image capture period (N-th) is started at the same time as the live-view period is terminated (timing 473). In the embodiment of the present disclosure, the determination as to whether or not to switch information to supply is started after a predetermined time (the same time as the recording image capture period (N-th)) elapses. This makes it possible to secure a predetermined time or more for display of the live-view images, to secure a time for the user to determine the composition, and to mitigate display flicker due to switching between display operations.

When the recording image capture period (N-th) is started, the shutter is closed ("close"), and the operation mode of the image sensor 140 is switched from the live-view image generation mode to the recording image generation mode ("switch"). Then, an operation for capturing a recording image is performed as in the recording image capture period (N-1-th). In FIG. 4, the operation mode of the image sensor 140 is switched ("switch") after a short time (time to capture LV7) elapses in the recording image capture period (N-th). This indicates that there is a time lag since the operation mode determination section 280 detects a transition of the continuous shooting determination information until the image sensor 140 switches between the modes. Also in the drawing, when the display of the live-view images is terminated, the N-1-th after-view image ("AV2 (N-1-th)") is displayed. This allows the user to examine the N-1-th image which was displayed only for a short time in the live-view period.

Thus, when reading of data from the image sensor 140 is terminated in image capture in the recording image generation mode, it is determined whether or not to continue the recording image generation mode on the basis of the continuous shooting determination information. Then, in the case where the continuous shooting determination information indicates that continuous shooting is allowed ("L" level), the recording image generation mode is continued to immediately capture a next image (N-1-th). In the case where the continuous shooting determination information indicates that an obstructive factor is occurring ("H" level), on the other hand, the operation mode is switched to the live-view image generation mode. When the obstructive factor is resolved in the live-view image generation mode, the operation mode is switched to the recording image generation mode to immediately capture a next image (N-th).

[Exemplary Operation of Imaging Apparatus]

Next, an operation of the imaging apparatus 100 according to the embodiment of the present disclosure will be described with reference to the drawings.

Figure 5:
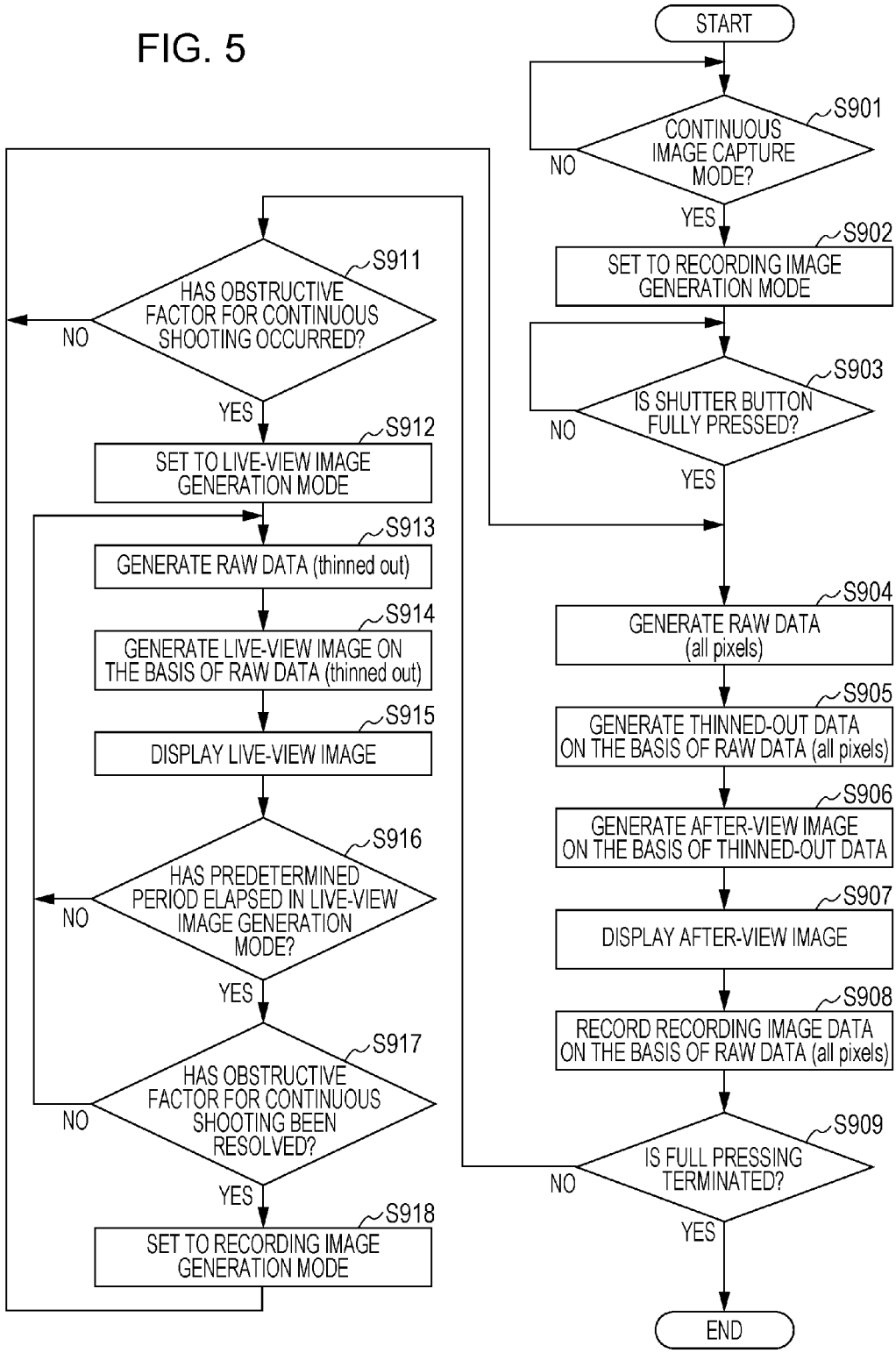
FIG. 5 is a flowchart showing exemplary continuous image capture control procedures performed in the imaging apparatus according to the embodiment of the present disclosure.

FIG. 5 is a flowchart showing exemplary continuous image capture control procedures performed in the imaging apparatus 100 according to the embodiment of the present disclosure.

First, the control section 130 determines whether or not the image capture mode of the imaging apparatus 100 is set to the continuous image capture mode (step S901). Then, in the case where it is determined that the image capture mode is not the continuous image capture mode (step S901), the process returns to step S901 so that the continuous image capture control procedures are not performed until the image capture mode is set to the continuous image capture mode.

In the case where it is determined that the image capture mode is the continuous image capture mode (step S901), on the other hand, the operation mode determination section 280 sets the operation mode of the image sensor 140 to the recording image generation mode (step S902). Subsequently, the control section 130 determines whether or not the shutter button is fully pressed (step S903). Then, in the case where it is determined that the shutter button is not fully pressed (step S903), the process returns to step S903 to wait until the shutter button is fully pressed.

In the case where it is determined that the shutter button is fully pressed (step S903), on the other hand, the image sensor 140 generates RAW data (all pixels) (step S904). Subsequently, the display image generation section 220 generates thinned-out data, in which pixel-by-pixel information contained in the RAW data (all pixels) has been thinned out, on the basis of the RAW data (all pixels) (step S905). Thereafter, the display image generation section 220 generates data on a display image (after-view image) on the basis of the generated thinned-out data (step S906). Then, the display section 160 displays the generated display image (after-view image) (step S907). Step S906 is an example of a first display image generation step according to an embodiment of the present disclosure.

Next, recording image data are generated on the basis of the RAW data (all pixels) by the recording image generation section 152, and then recorded by the recording section 153 (step S908). Step S908 is an example of a recording image generation step according to an embodiment of the present disclosure.

Subsequently, the control section 130 determines whether or not the full pressing of the shutter button has been terminated (step S909). Then, in the case where it is determined that the full pressing of the shutter button has been terminated (step S909), the continuous image capture control procedures are terminated.

In the case where it is determined that the full pressing of the shutter button has not been terminated (step S909), on the other hand, it is determined whether or not an obstructive factor for continuous shooting has occurred (step S911). Then, in the case where it is determined that an obstructive factor for continuous shooting has not occurred (step S911), the process returns to step S904.

In the case where it is determined that an obstructive factor for continuous shooting has occurred (step S911), meanwhile, the operation mode determination section 280 sets the operation mode of the image sensor 140 to the live-view image generation mode (step S912). Subsequently, image capture is performed in the live-view image generation mode, and the image sensor 140 generates RAW data (thinned out) through thinned-out reading (step S913). Subsequently, the display image generation section 220 generates data on a display image (live-view image) on the basis of the generated RAW data (thinned out) (step S914). Thereafter, the display section 160 displays the generated live-view image (step S915). Step S913 and step S904 are an example of an image capture step according to an embodiment of the present disclosure. Step S914 is an example of a second display image generation step according to an embodiment of the present disclosure.

Subsequently, the operation mode determination section 280 determines whether or not a predetermined time has elapsed since the operation mode is set to the live-view image generation mode (step S916). Then, in the case where it is determined that a predetermined time has not elapsed, the process returns to step S913.

In the case where it is determined that a predetermined time has elapsed (step S916), on the other hand, it is determined whether or not the obstructive factor for continuous shooting has been resolved (step S917). Then, in the case where it is determined that the obstructive factor for continuous shooting has not been resolved (step S917), the process returns to step S913. Step S917 and step S911 are an example of a detection step according to an embodiment of the present disclosure.

In the case where it is determined that the obstructive factor for continuous shooting has been resolved (step S917), meanwhile, the operation mode determination section 280 sets the operation mode of the image sensor 140 to the recording image generation mode (step S918), and the process returns to step S904. Step S918 and step S912 are an example of a mode control step according to an embodiment of the present disclosure.

According to the embodiment of the present disclosure, as has been described above, it is possible to appropriately provide the user with a display image for subject examination when continuously capturing a plurality of recording images by switching between the recording image generation mode and the live-view image generation mode in accordance with whether or not an obstructive factor is occurring. That is, in the case where an obstructive factor is occurring, a live-view image is displayed on the display screen, which does not result in frozen display during continuous shooting. This makes it possible to examine the composition of a next recording image to be captured even in the case where continuous shooting is obstructed halfway, as with a single-lens reflex camera provided with an optical finder to allow examination of the composition even during continuous shooting by moving up and down a mirror.

In the imaging apparatus 100, RAW data (all pixels) are duplicated to be supplied to the display image generation section 220 and the recording image generation section 152 so that a display image and a recording image are generated separately, which allows quick generation of a display image. This allows a display image (after-view image) to be displayed immediately after the termination of reading of data from the image sensor 140, which increases the time for examination of the after-view image. By generating the display image and the recording image separately, it is possible to generate a live-view image even if the recording image generation process falls behind to make the buffer full.

In the embodiment of the present disclosure, a single-lens camera that performs in-focus determination using a contrast scheme is assumed. However, the present disclosure is not limited thereto, and may be similarly applied to a camera that performs in-focus determination using a phase difference detection scheme. In the embodiment of the present disclosure, it is assumed to reduce the amount of RAW data through thinned-out reading and a thinning-out process. However, the present disclosure is not limited thereto. As described in relation to FIG. 1, the amount of RAW data may be similarly reduced through added reading and an adding process in which data from adjacently disposed pixels are added.

In the embodiment of the present disclosure, a full state of the buffer, a state in which the focusing object may not be brought into focus by auto focus (an in-focus position may not be estimated), a non-charged state of the strobe, and a shortage of a supplied current are assumed to be obstructive factors. However, the present disclosure is not limited thereto, and a variety of other obstructive factors are also conceivable. For example, a case where the settings of the imaging apparatus 100 are changed because of changes in aperture and shutter speed values during a continuous shooting action is conceivable. In this case, in addition, in the case where changes in the settings are detected, the obstruction detection section 230 supplies the continuous shooting determination information indicating that an obstructive factor is occurring.

In the embodiment of the present disclosure, it is assumed that the image capture mode of the imaging apparatus 100 is set to the continuous shooting mode. However, the present disclosure is not limited thereto. An obstructive factor may occur to obstruct next capture of a recording image also in the case where the user depresses the shutter button (image capture command operation) a plurality of times in a short time to continuously capture a plurality of recording images by repeating single captures a plurality of times. Also in this case, it is possible to appropriately provide the user with a display image for subject examination by applying an embodiment of the present disclosure.

In the embodiment of the present disclosure, a single-lens camera is described. However, an embodiment of the present disclosure is also applicable to other apparatuses that include an imaging element. For example, an embodiment of the present disclosure is also applicable to a digital still single-lens reflex camera and a compact digital camera besides the single-lens camera.

The embodiment of the present disclosure is illustrative of an exemplary implementation of the present disclosure. As clarified in the embodiment of the present disclosure, the elements in the embodiment of the present disclosure and the elements defining the present disclosure in the appended claims correspond to each other. Likewise, the elements defining the present disclosure in the appended claims and the elements in the embodiment of the present disclosure denoted by the same names correspond to each other. The present disclosure is not limited to the embodiment described above, and the embodiment may be modified in various ways without departing from the scope and spirit of the present disclosure.

The process procedures described in the embodiment of the present disclosure may be considered as a method including such a series of procedures, as a program that causes a computer to execute the series of procedures, or as a recording medium that stores the program. As the recording medium, a CD (Compact Disc), an MD (MiniDisc), a DVD (Digital Versatile Disk), a memory card, a Blu-ray Disc (registered trademark), and so forth may be used, for example.

What is claimed is:

1. A display control apparatus, comprising:
   an image sensor configured to generate image data;
   a buffer configured to retain said image data;
   a recording medium configured to record said image data;
   a display screen; and
   a computer configured to:
      control a display mode for said display screen;
      switch, based on an execution of an image capture command operation in a continuous shooting mode in which a plurality of continuous still images are captured, said display mode between an after-view image display mode and a live-view image display mode,
      wherein, in said after-view image display mode, an after-view image corresponding to said image data on said recording medium is displayed on said display screen, and
      wherein, in said live-view image display mode, a live-view image is displayed on said display screen;
      duplicate said image data before said image data is retained in said buffer,
      wherein an obstructive factor that corresponds to a free space of said buffer occurs based on said execution of said image capture command operation in said continuous shooting mode; and
      display, on said display screen, said live-view image based on a shortage of said free space of said buffer, wherein said live-view image corresponds to said duplicated image data.

2. The display control apparatus according to claim 1, wherein said image sensor is further configured to generate a plurality of image data,
   wherein said buffer is further configured to retain said plurality of image data, and
   wherein said computer is further configured to switch said display mode between said after-view image display mode and said live-view image display mode based on said obstructive factor.

3. The display control apparatus according to claim 2, wherein a first state of said display control apparatus is indicative of said shortage of said free space of said buffer to retain further image data, and a second state of said display control apparatus is indicative of a recovery of said free space of said buffer.

4. The display control apparatus according to claim 1, wherein said image data is raw data, and wherein said buffer is further configured to retain a plurality of pieces of said raw data.

5. The display control apparatus according to claim 4, wherein said computer is further configured to:
   generate thinned-out data from said raw data;
   develop said thinned-out data; and
   generate said after-view image based on said developed thinned-out data.

6. The display control apparatus according to claim 4, wherein said computer is further configured to control supply of said raw data as said image data, based on said image data recorded on said recording medium as said raw data.

7. The display control apparatus according to claim 1, wherein said image sensor is further configured to:
   generate raw data from a reduced amount of read data; and
   generate said live-view image based on said raw data.

8. The display control apparatus according to claim 1, wherein said computer is further configured to generate compressed image data as said image data.

9. The display control apparatus according to claim 1, wherein said image sensor is further configured to:
   generate after-view image data in said after-view image display mode; and
   generate live-view image data in said live-view image display mode, wherein a first data amount of said after-view image data is higher than a second data amount of said live-view image data.

10. The display control apparatus according to claim 1, wherein said computer is further configured to wait for a threshold time to switch said live-view image display mode to said after-view image display mode after switch of said after-view image display mode to said live-view image display mode.

11. The display control apparatus according to claim 1, wherein
   said computer is further configured to:
      receive a continuous image capture command operation; and
      switch said after-view image display mode to said live-view image display mode based on said continuous image capture command operation.

12. The display control apparatus according to claim 1, further comprising a strobe configured to emit light to a subject, wherein said image sensor is further configured to:
   receive subject light from said subject; and
   generate said image data based on said subject light.

13. The display control apparatus according to claim 12, wherein said computer is further configured to switch said after-view image display mode to said live-view image display mode based on a state of charge of said strobe.

14. The display control apparatus according to claim 1, wherein said computer is further configured to manage a power source of said display control apparatus.

15. The display control apparatus according to claim 14, wherein said computer is further configured to switch said after-view image display mode to said live-view image display mode based on a result of said management of said power source.

16. The display control apparatus according to claim 1, further comprising a body having a shutter button.

17. The display control apparatus according to claim 16, further comprising a lens mountable to said body, along an optical axis of said image sensor.

18. The display control apparatus according to claim 1, wherein said display screen comprises an Electronic View Finder (EVF).

19. A method, comprising:
in a display control apparatus:
generating image data by an imaging element;
controlling display mode for a display screen;
switching, based on an execution of an image capture command operation in a continuous shooting mode in which a plurality of continuous still images are captured, said display mode between an after-view image display mode and a live-view image display mode;
duplicating said image data before said image data is retained in a buffer;
retaining, in said buffer, said image data generated by said imaging element;
recording said image data on a recording medium of said display control apparatus,
wherein, in said after-view image display mode, an after-view image corresponding to said image data on said recording medium is displayed on said display screen,
wherein, in said live-view image display mode, a live-view image is displayed on said display screen,
wherein said buffer is different from said recording medium, and
wherein an obstructive factor that corresponds to a free space of said buffer occurs based on said execution of said image capture command operation in said continuous shooting mode; and
displaying, on said display screen, said live-view image based on a shortage of said free space of said buffer, wherein said live-view image corresponds to said duplicated image data.

20. The method according to claim 19, further comprising:
generating a plurality of image data by said imaging element;
retaining, in said buffer, said plurality of image data; and
switching said display mode between said after-view image display mode and said live-view image display mode based on said obstructive factor.

21. The method according to claim 20, wherein a first state of said display control apparatus is indicative of said shortage of said free space of said buffer to retain further image data, and a second state of said display control apparatus is indicative of a recovery of said free space of said buffer.

22. The method according to claim 19, wherein said image data is raw data, and
wherein said method further comprising
retaining a plurality of pieces of said raw data.

23. The method according to claim 22, further comprising:
generating thinned-out data by thinning said raw data;
developing said thinned-out data; and
generating said after-view image based on said developed said thinned-out data.

24. The method according to claim 22, further comprising supplying said raw data as said image data, based on said image data recorded on said recording medium as said raw data.

25. The method according to claim 19, further comprising;
generating, by said imaging element, raw data by reading a reduced amount of read data; and
generating said live-view image based on said raw data.

26. The method according to claim 19, further comprising generating compressed image data as said image data.

27. The method according to claim 19, wherein a first data amount of after-view image data generated by said imaging element in said after-view image display mode is higher than a second data amount of live-view image data generated by said imaging element in said live-view image display mode.

28. The method according to claim 19, further comprising waiting for a threshold time to switch said live-view image display mode to said after-view image display mode after switching said after-view image display mode to said live-view image display mode.

29. The method according to claim 19, further comprising:
receiving a continuous image capture command operation; and
switching said after-view image display mode to said live-view image display mode based on said continuous image capture command operation.

30. The method according to claim 19, further comprising:
emitting light, by a light emitting section, to a subject;
receiving, by said imaging element, subject light from said subject; and
generating said image data based on said subject light.

31. The method according to claim 30, further comprising switching said after-view image display mode to said live-view image display mode based on a state of charge of said light emitting section.

32. The method according to claim 19, further comprising managing a power source of said display control apparatus.

33. The method according to claim 32, further comprising switching said after-view image display mode to said live-view image display mode based on a result of said management of said power source.

34. The method according to claim 19, wherein said display screen comprises an Electronic View Finder (EVF).

* * * * *